United States Patent
Dolph et al.

(10) Patent No.: US 8,924,875 B2
(45) Date of Patent: Dec. 30, 2014

(54) DATA RECOVERY

(75) Inventors: Blaine H. Dolph, Western Springs, IL (US); Robert J. Torres, Colleyville, TX (US)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 13/245,009

(22) Filed: Sep. 26, 2011

(65) Prior Publication Data

US 2013/0080952 A1 Mar. 28, 2013

(51) Int. Cl.
 *G06F 3/00* (2006.01)
 *G06F 17/24* (2006.01)

(52) U.S. Cl.
 CPC ................... *G06F 17/243* (2013.01)
 USPC ....................................... 715/767

(58) Field of Classification Search
 CPC .............. G06F 3/0481; G06F 2203/04804; G06F 9/4443; G06F 3/0482; G06F 3/048
 USPC ....................................... 715/767
 See application file for complete search history.

(56) References Cited

U.S. PATENT DOCUMENTS

| | | | |
|---|---|---|---|
| 7,587,385 B2 | 9/2009 | Vayssiere | |
| 7,634,738 B2 * | 12/2009 | Clow et al. | 715/802 |
| 7,831,267 B2 | 11/2010 | Klassen et al. | |
| 2003/0071850 A1 | 4/2003 | Geidl | |
| 2006/0059247 A1 * | 3/2006 | Marappan et al. | 709/219 |
| 2007/0006092 A1 | 1/2007 | Makela | |
| 2009/0094551 A1 * | 4/2009 | Alkov et al. | 715/802 |
| 2010/0058199 A1 | 3/2010 | Gera et al. | |
| 2010/0325100 A1 | 12/2010 | Forstall et al. | |
| 2011/0016389 A1 | 1/2011 | Gordon et al. | |

OTHER PUBLICATIONS

Method for Preventing Password Field From Losing Focus, May 4, 2009, www.ip.com, PriorArtDatabase, IP.com No. IPCOM000182606D, 3 pages plus cover sheet.
Client side interactive formatting for input fields in a Web application, Jan. 14, 2004, www.ip.com. PriorArtDatabase, IP.com No. IPCOM000021333D, 3 pages plus cover sheet.
Automatic Correction of Mangled Hyperlinks and Other Document Corruptions, with Optional Prompting, Jun. 21, 2003, www.ip.com, PriorArtDatabase, IP.com No. IPCOM000016023D, 5 pages plus cover sheet.
Book et al., Specification and Control of Interface Responses to User Input in Rich Internet Applications, 2009 IEEE/ACM International Conference on Automated Software Engineering, 1527-1366/09, DOI 10.1109/ASE.2009.10, pp. 321-331.

* cited by examiner

*Primary Examiner* — Kyle Stork
(74) *Attorney, Agent, or Firm* — Schmeiser, Olsen & Watts; Matthew Chung

(57) ABSTRACT

A data recovery method and system is provided. The method includes initializing and presenting by a processor, a computer generated presentation data. The processor monitors input cursor focus, a cursor, and data input from a user with respect to the computer generated presentation data. The data input is automatically stored within a specified memory unit. A portion of the data input is directed to an associated area in the computer generated presentation data. A focus change with respect to the cursor, the associated area, and the data input is detected and in response, a message a message indicating the focus change is presented to the user. The processor receives a command from the user in response to the message.

18 Claims, 7 Drawing Sheets

DATA RECOVERY

FIELD

The present invention relates method and associated system for recovering user interface data.

BACKGROUND

Maintaining data typically comprises an inaccurate process with little flexibility. Data maintenance within a system typically includes a manual process. Manually maintaining data may be time consuming and require a large amount of resources. Accordingly, there exists a need in the art to overcome at least some of the deficiencies and limitations described herein above.

SUMMARY

The present invention provides a method comprising: initializing, by a computer processor of a computing apparatus, computer generated presentation data; presenting, by the computer processor via a video monitor of the computing apparatus, the computer generated presentation data; monitoring, by the computer processor, input cursor focus with respect to the computer generated presentation data and a cursor of the computing apparatus; monitoring, by the computer processor, data input from a user with respect to the computer generated presentation data; automatically storing, by the computer processor within a specified memory unit, the data input; directing, by the computer processor, a first portion of the data input to a first associated area in the computer generated presentation data; detecting, by the computer processor, a first focus change with respect to the cursor, the first associated area, and the data input; presenting, by the computer processor to the user in response to the detecting the first focus change, a message indicating the first focus change; and receiving, by the computer processor from the user in response to the presenting, a command from the user.

The present invention provides a computing system comprising a computer processor coupled to a computer-readable memory unit, the memory unit comprising instructions that when executed by the computer processor implements a method comprising: initializing, by the computer processor, computer generated presentation data; presenting, by the computer processor via a video monitor of the computing apparatus, the computer generated presentation data; monitoring, by the computer processor, input cursor focus with respect to the computer generated presentation data and a cursor of the computing apparatus; monitoring, by the computer processor, data input from a user with respect to the computer generated presentation data; automatically storing, by the computer processor within a specified memory unit, the data input; directing, by the computer processor, a first portion of the data input to a first associated area in the computer generated presentation data; detecting, by the computer processor, a first focus change with respect to the cursor, the first associated area, and the data input; presenting, by the computer processor to the user in response to the detecting the first focus change, a message indicating the first focus change; and receiving, by the computer processor from the user in response to the presenting, a command from the user.

The present invention provides a computer program product, comprising a computer readable storage device storing a computer readable program code, the computer readable program code comprising an algorithm that when executed by a computer processor of a computing system implements a method, the method comprising: initializing, by the computer processor, computer generated presentation data; presenting, by the computer processor via a video monitor of the computing apparatus, the computer generated presentation data; monitoring, by the computer processor, input cursor focus with respect to the computer generated presentation data and a cursor of the computing apparatus; monitoring, by the computer processor, data input from a user with respect to the computer generated presentation data; automatically storing, by the computer processor within a specified memory unit, the data input; directing, by the computer processor, a first portion of the data input to a first associated area in the computer generated presentation data; detecting, by the computer processor, a first focus change with respect to the cursor, the first associated area, and the data input; presenting, by the computer processor to the user in response to the detecting the first focus change, a message indicating the first focus change; and receiving, by the computer processor from the user in response to the presenting, a command from the user.

The present invention advantageously provides a simple method and associated system capable of maintaining data.

DETAILED DESCRIPTION

Figure 1:
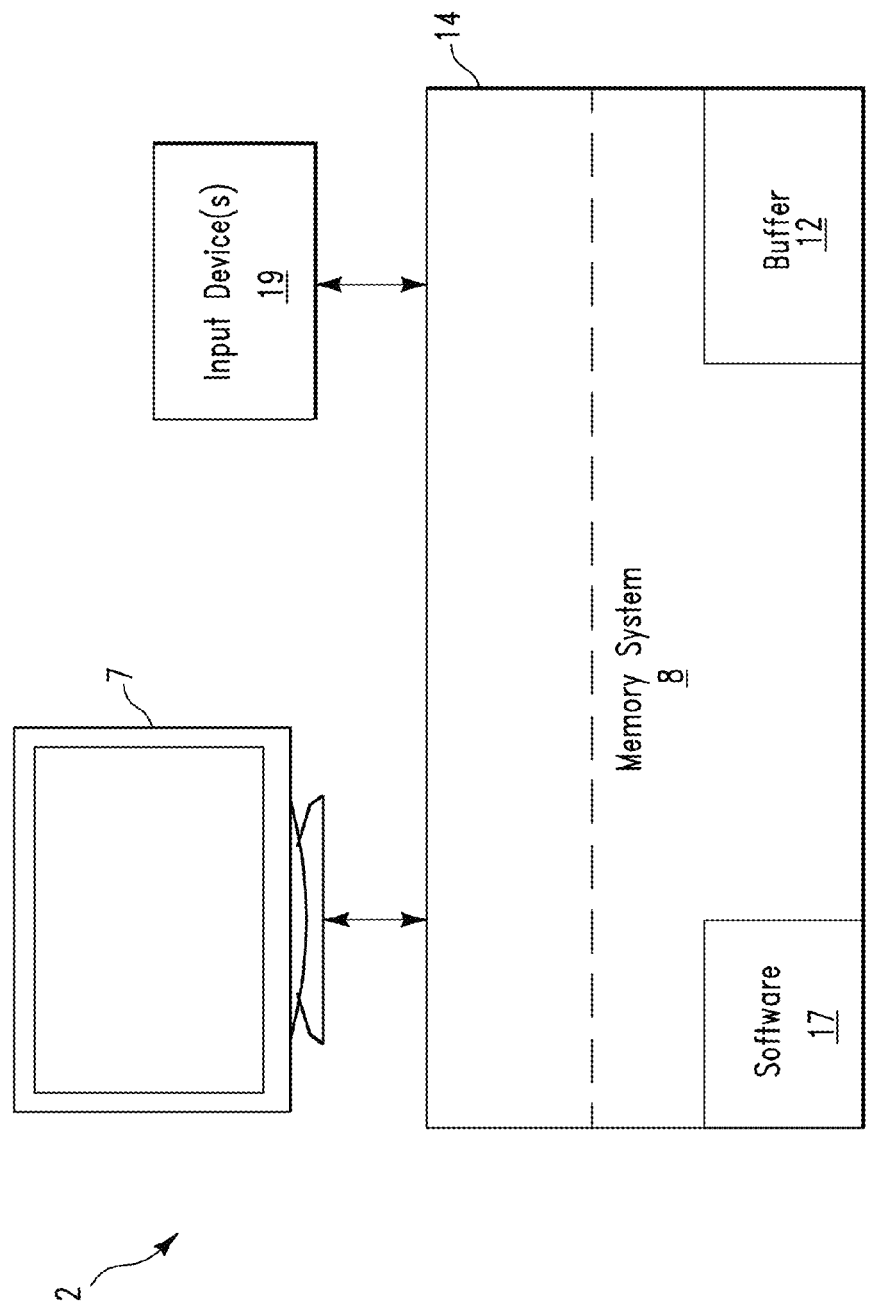
FIG. 1 illustrates a system 2 for recovering lost text, in accordance with embodiments of the present invention.

FIG. 1 illustrates a system 2 for recovering lost text, in accordance with embodiments of the present invention. System 2 enables a process for recovering lost text resulting from being out of focus when entering data on a Web browser page, any type of document (i.e., comprising text input areas), any type of presentation data. Focus is defined herein as a component (e.g., a text area) of a graphical user interface currently selected to receive data input. For example, text entered via a keyboard or pasted from a clipboard is transmitted to the component currently comprising the focus. Focus may be withdrawn from an element by giving another element the focus (e.g., another running system may automatically withdraw the focus). System 2 stores text characters (e.g., in a buffer 12) as a user enters data (e.g., when no text area on a document page has been selected). The user (i.e., when it has been determined that no data has been entered into a text area) may click on the text area and be prompted to copy contents (i.e., entered data) of a buffer 12 (comprising the contents) into the text area. Alternatively, system 2 may auto-paste the buffer 12 contents into the area. Additionally, the text may be automatically copied across text areas (e.g., in a spreadsheet document). System 2 may enable an audio alert indicating that the text is being entered/saved into the buffer 12.

System 2 of FIG. 1 comprises a monitor 7 and input devices 19 connected to a computing system 14. Monitor 7 may comprise any type of monitor including, inter alia, an LCD monitor, an LED monitor, a plasma monitor, a CRT monitor, etc. Input devices 19 may comprise, inter alia, a mouse, a keyboard, a keypad, a joystick, etc. Computing system 14 comprises a memory system 8. Memory system 8 may comprise a single memory system. Alternatively, memory system 8 may comprise a plurality of memory systems. Memory system 8 comprises a software application 17 and a buffer 12. Alternatively, buffer 12 may be located at any location in computing system 14 (e.g., a CPU buffer, etc). Software application 17 controls all functionality associated with recovering lost text/characters/data.

Software application 17 enables a process for automatically storing text/characters/data in buffer 12. Stored contents of buffer 12 may be presented to a user at any location of a Web browser window (on monitor 7). The following description describes an implementation example enabled by system 2:

A user loads a Webpage and begins to type characters into an area on the Webpage (e.g., a password on a login page, a name or address on an online form, etc). As the user is typing, he/she notices that no data has been entered into a desired text area (e.g., focus has been lost). In response, the user may click (i.e., with a mouse) on the desired text area and (in response) computing system 14 will prompt the user to copy contents of buffer 12 (i.e., the un-entered text) into the desired text area. Alternatively, computing system 14 may automatically paste contents of buffer 12 (i.e., the un-entered text) into the desired text area. Additionally (if buffer 12 comprises a new line character in its stream), the text may be copied across multiple text areas. An audio alert indicating text being stored in buffer 12 may additionally be enabled. System 2 may enable a process for saving inputs and interactions from multiple areas in buffer 12 (e.g., when a page is refreshed and input data is lost). Buffer 12 may additionally save inputs, interactions (e.g., tabbing), and selections (e.g., drop-down choices). A user may correct errors and auto-copy prior inputs and selections thereby avoiding repetitive keystrokes and mouse clicks.

Software application enables the following process for recovering lost text:

A user opens an application and navigates to a screen or page comprising a text area. Upon enabling a text key on a keyboard (if a text area comprises focus and the buffer comprises a value), the user is prompted to copy the contents of a buffer (e.g., buffer 12) into the text area and the text is copied. If there are new line characters in the text area and there are multiple text areas, the text may be spread across the multiple text areas and the buffer is cleared. Alternatively, if a text area comprises focus that does not accept text input (e.g., a drop-down menu, etc), text input may be stored in the buffer (for later use) and contents of the buffer may be display at any location on a display (e.g., display 7).

Figure 2:
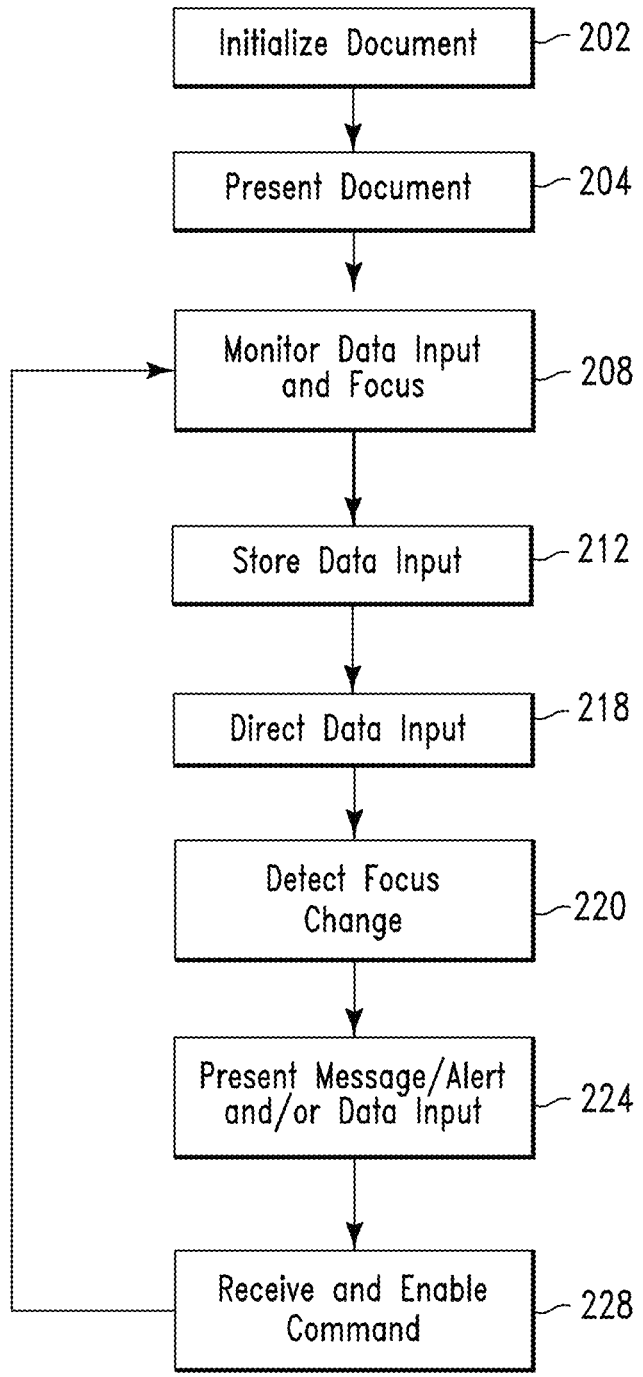
FIG. 2 illustrates a flowchart describing an algorithm used by the system of FIG. 1 for recovering lost text, in accordance with embodiments of the present invention.

FIG. 2 illustrates a flowchart describing an algorithm used by system 2 of FIG. 1 for recovering lost text, in accordance with embodiments of the present invention. In step 202, a computer processor of a computing apparatus (e.g., computing system 14 of FIG. 1) initializes a computer generated document (or Webpage or any type of presentation data) for accepting data input (e.g., an online motor vehicle registration form). In step 204, the computer processor presents (via a graphical user interface (GUI) on a video monitor) the computer generated document. In step 208, the computer processor monitors input cursor focus with respect to the computer generated document and a cursor (i.e., for mouse input) on the GUI. Additionally, data input (from a user) with respect to the computer generated document is monitored. In step 212, the data input is automatically stored within a specified memory unit (e.g., a buffer). In step 218, a portion(s) of the data input is directed to an associated area in the computer generated document. In step 220, the computer processor detects a focus change with respect to the cursor, the associated area, and the data input. The focus change detected may be associated with areas in a same document or areas in multiple documents. In step 224 (in response to step 220), the computer processor presents (to the user) a message indicating the focus change. Additionally, the data input currently stored in the buffer may be presented to the user via a specified location on the GUI. In step 228, a user command (with respect to the data input and the focus change) is received and enabled and step 208 is repeated to continue monitoring. The command may indicate a request to enable a recovery of the data input from the buffer.

Figure 3:
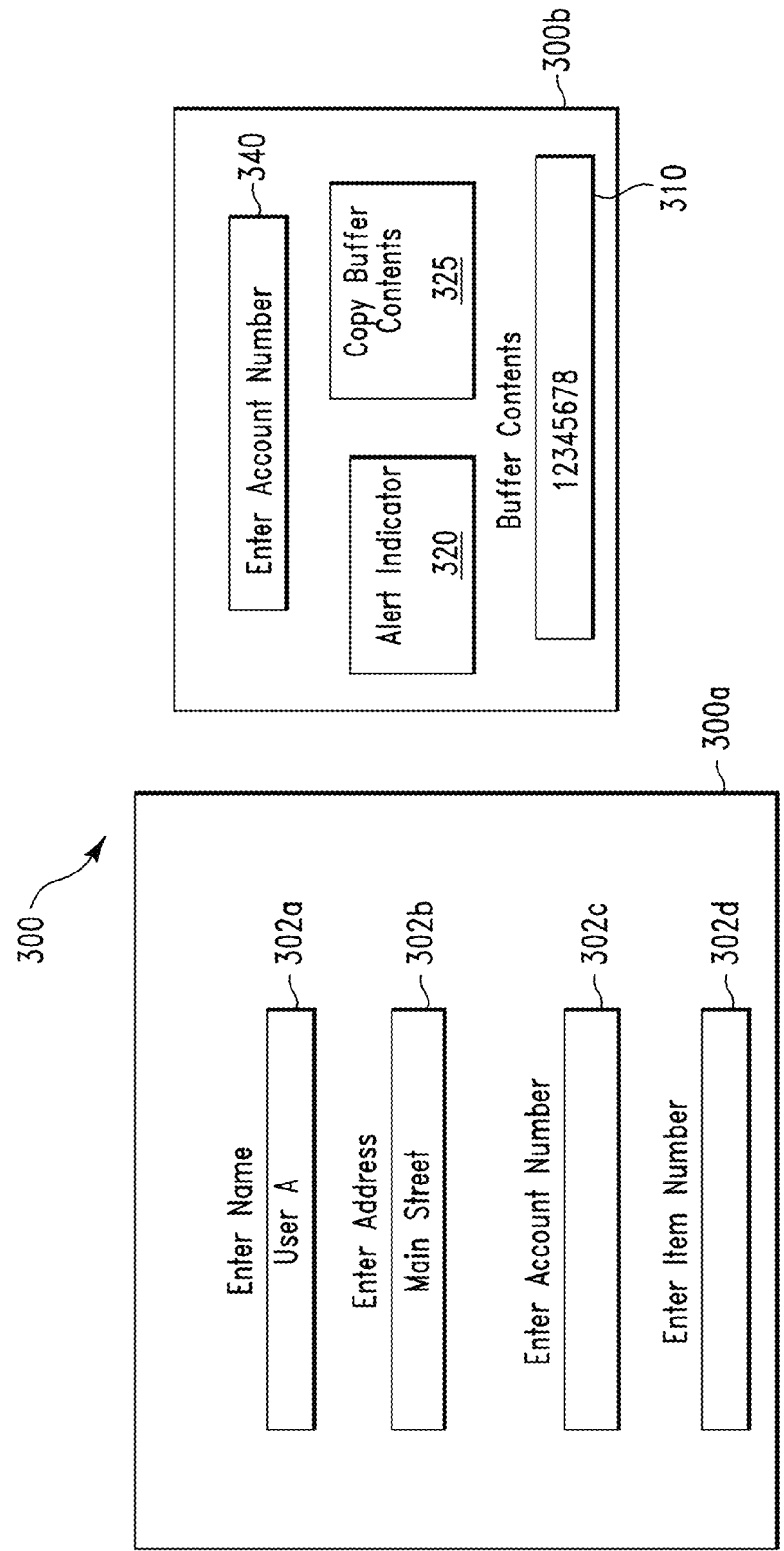
FIG. 3 illustrates an example screen shot comprising computer generated presentation data and a GUI for enabling a lost text recovery process, in accordance with embodiments of the present invention.

FIG. 3 illustrates an example screen shot 300 comprising a computer generated document 300a and a GUI 300b for enabling a lost text recovery process, in accordance with embodiments of the present invention. Screen shot 300 is presented via a monitor (e.g., monitor 7 of FIG. 1) Computer generated document 300a may be presented on a first portion of the monitor and GUI 300b may be presented on a second portion of the monitor. As an additional alternative, computer generated document 300a may be presented on a first monitor and GUI 300b may be presented on a second monitor. Computer generated document 300a illustrates an example of a document used to purchase an item. Computer generated document 300a comprises an input area 302a (for entering a user name), an input area 302b (for entering a user address), an input area 302c (for entering a user account number), and an input area 302d (for entering an item number for purchase). Input area 302a has been filled with a user name (user A) and input area 302b has been filled with an address for user A (Main St.). Input areas 302c and 302d are not currently filled. GUI 300b comprises an alert indicator 320, a copy buffer contents GUI switch 325, and a buffer contents display 310. In the example illustrated in FIG. 3, a user has lost focus (with respect to input area 302c) while entering an account number. The entered account number is displayed via the buffer contents display 310 and the user is alerted by the alert indicator 320 that focus has been lost and buffer contents (displayed by buffer contents display 310) may be automatically placed in input area 302c by enabling GUI switch 325. The alert indicator 320 may provide a visual indicator (e.g., the alert indicator 320 lights up or changes color) and/or an audible indicator (e.g., enables an audible sound via a computing system). GUI switch 325 may be enabled by pointing and clicking on GUI switch (e.g., using a computer mouse).

Figure 4A:
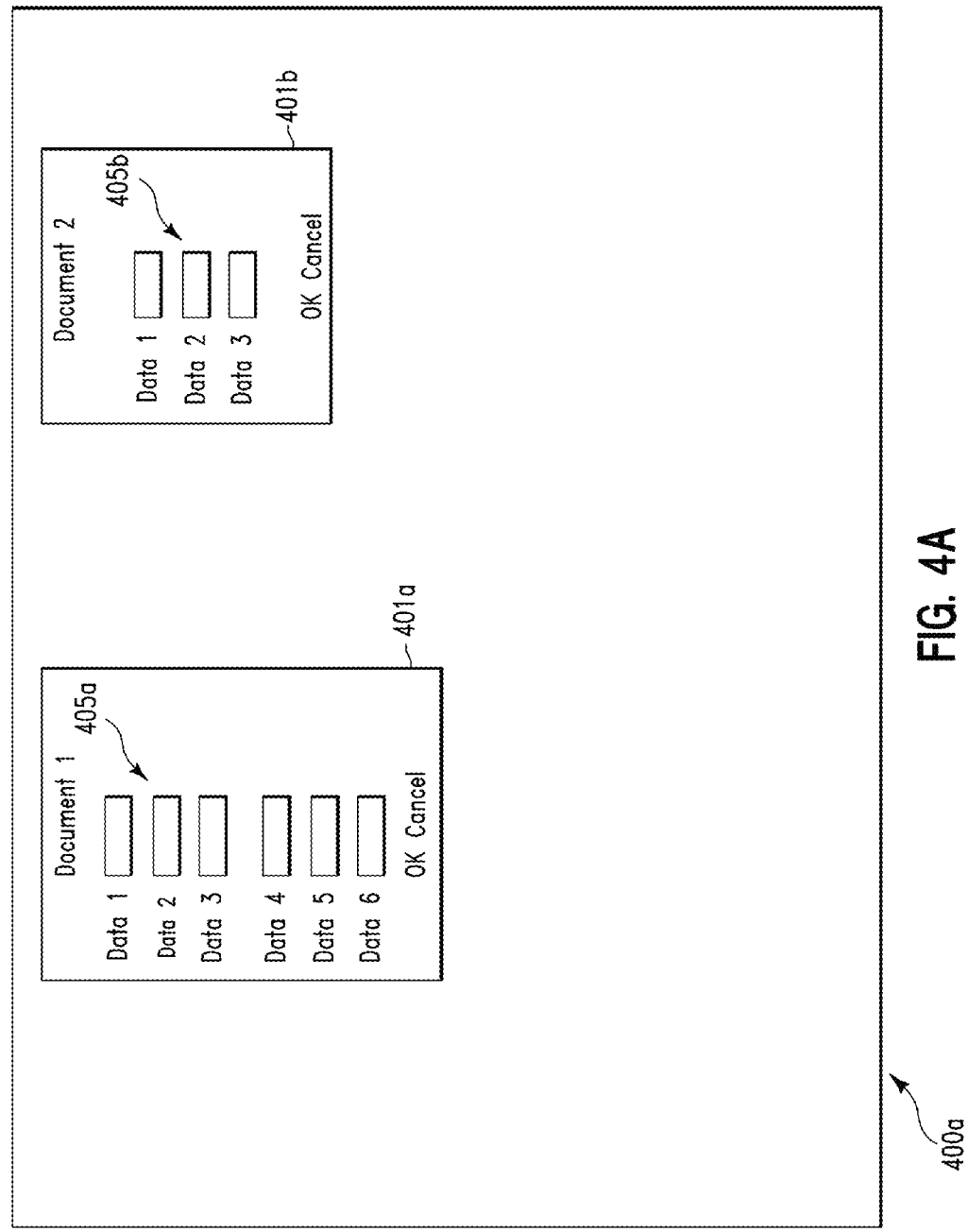
FIGS. 4A-4C illustrate an implementation example describing a focus loss and recovery process between multiple computer generated presentation data on a computing system, in accordance with embodiments of the present invention.
Figure 4B:
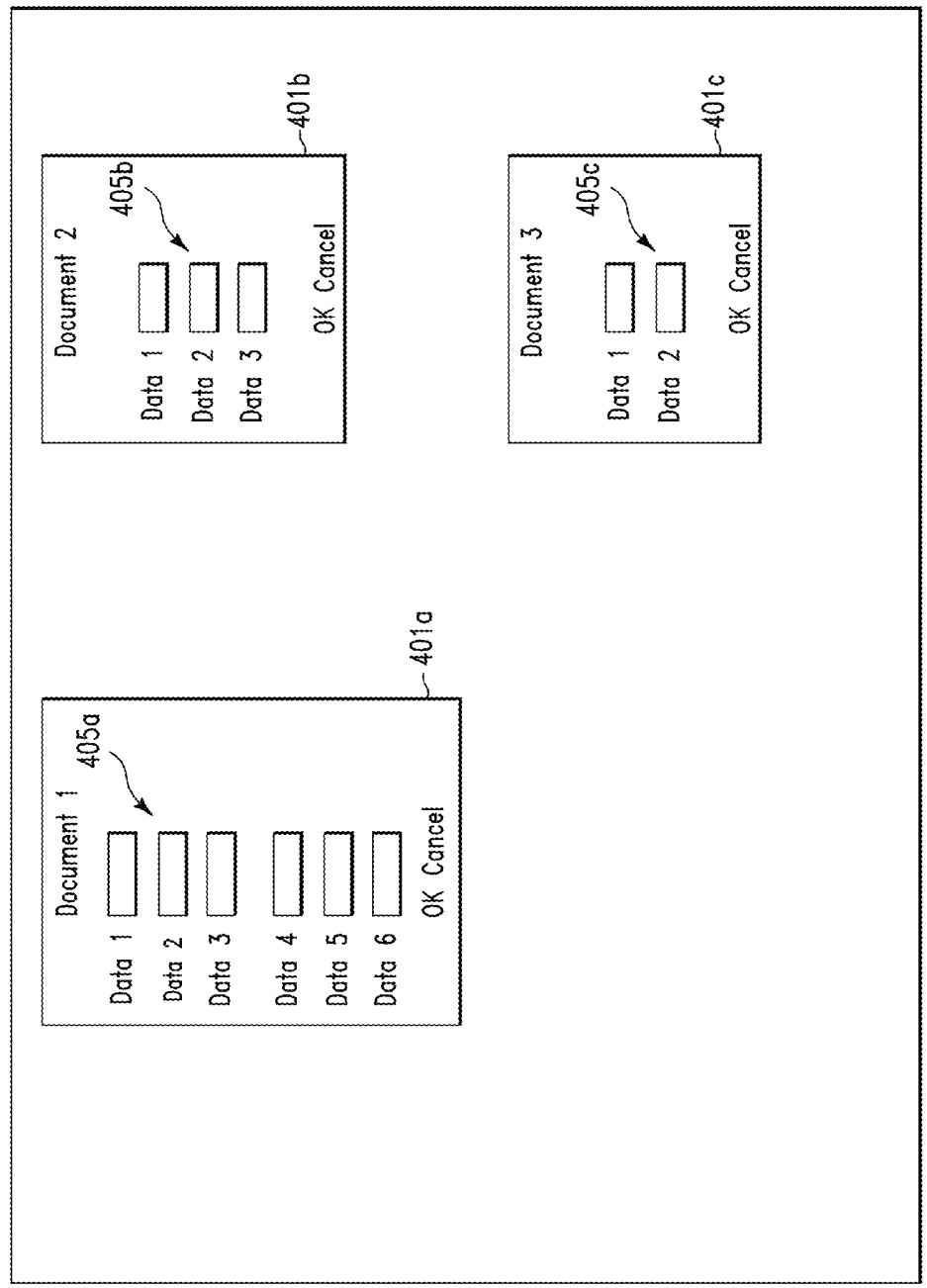
Figure 4C:
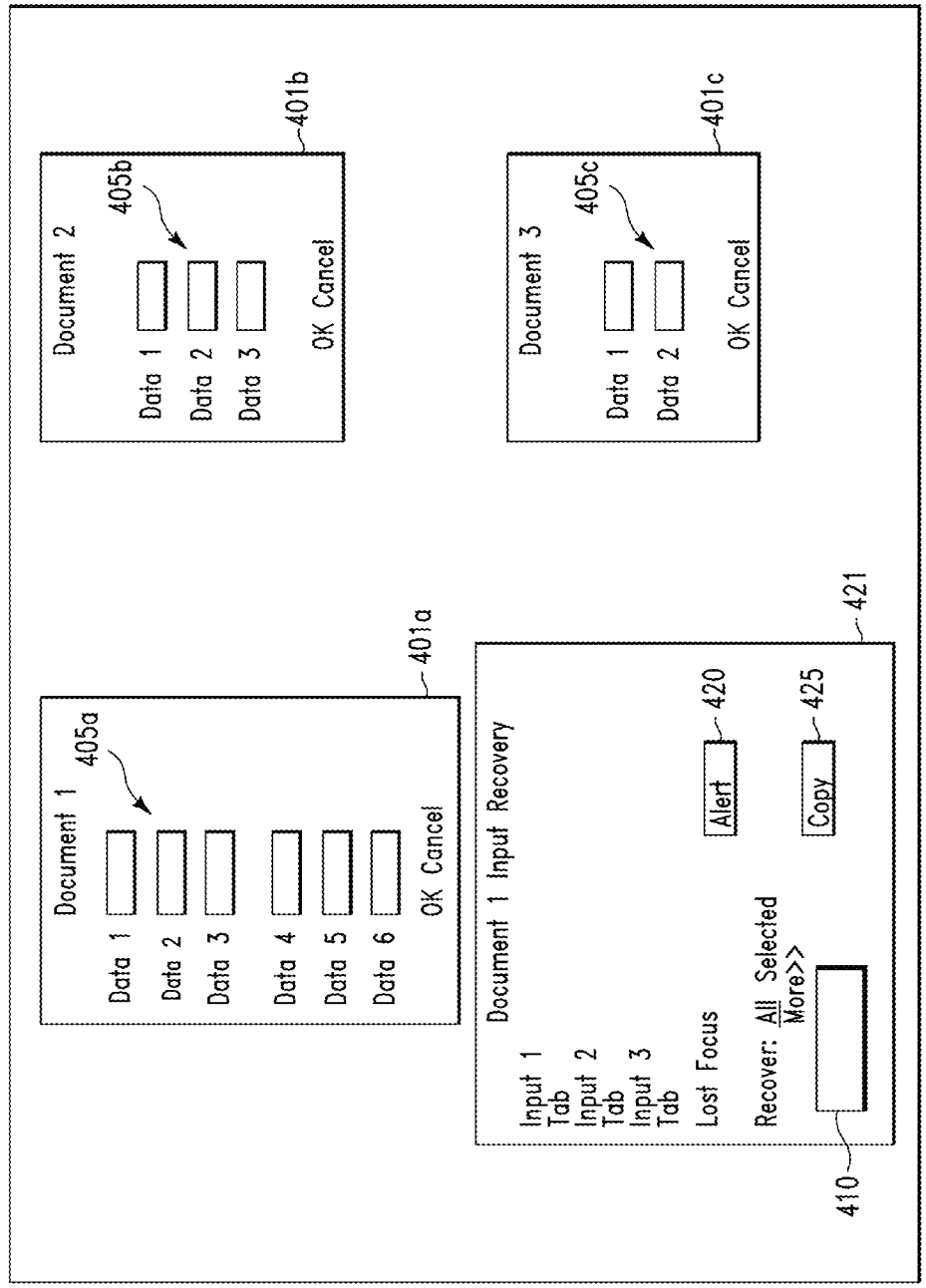

FIGS. 4A-4C illustrate an implementation example describing a focus loss and recovery process between multiple computer generated documents on a computing system, in accordance with embodiments of the present invention.

FIG. 4A illustrates a screen shot 400a comprising a document 401a (document 1) comprising focus and a document 401b (document 2) without focus. Document 401a comprises input areas 405a. Document 401b comprises input areas 405b. Document 401a maintains focus until a user changes the focus.

FIG. 4B illustrates a screen shot 400b comprising document 401a (document 1) comprising lost focus, document 401b (document 2) without focus, and a document 401c (document 3) comprising focus. Document 401c comprises input areas 405c. Due to a malfunction or protocol break, document 401a has lost focus to document 401c.

FIG. 4C illustrates a screen shot 400c comprising document 401a (document 1) regaining focus and documents 401b and 401c without focus. Additionally, FIG. 4C illustrates a document/text recovery GUI 421. GUI 421 comprises an alert indicator 420, a copy buffer contents GUI switch 425, and a buffer contents display 410. In the example illustrated in FIGS. 4A-4C, a user has lost and regained focus (with respect to documents 401a and 401c) while entering data into input areas 405a. The entered data is displayed via the buffer contents display 410 and the user is alerted by the alert indicator 420 that focus has been lost and buffer contents (displayed by buffer contents display 410) may be automatically placed in input areas 405a by enabling GUI switch 425. The alert indicator 420 may provide a visual indicator (e.g., the alert indicator 420 lights up or changes color) and/or an audible indicator (e.g., enables an audible sound via a computing system). GUI switch 425 may be enabled by pointing and clicking on GUI switch (e.g., using a computer mouse).

Figure 5:
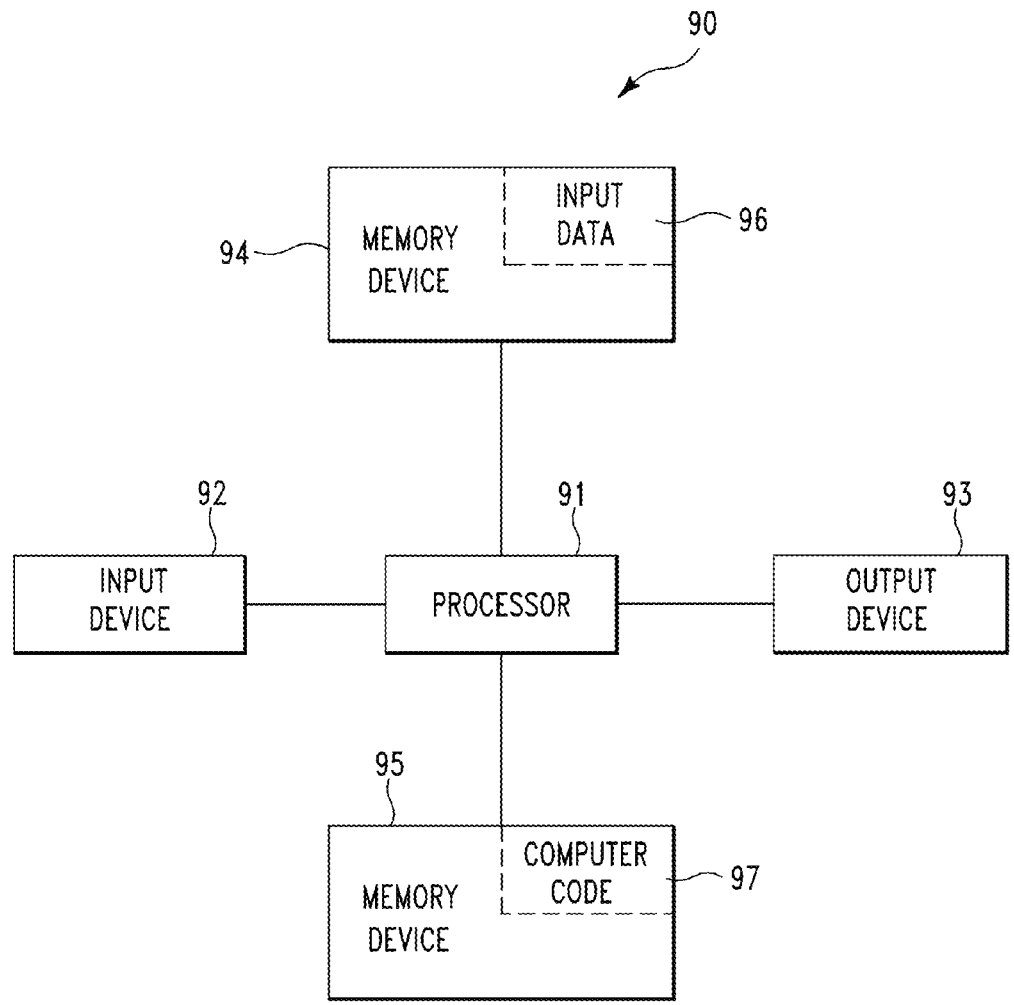
FIG. 5 illustrates a computer apparatus used for recovering lost text, in accordance with embodiments of the present invention.

FIG. 5 illustrates a computer apparatus 90 (e.g., computing system 14 of FIG. 1) used for recovering lost text, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for recovering lost text. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service supplier who offers to recover lost text. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for recovering lost text. In another embodiment, the invention provides a business method that performs the process steps of the invention on a subscription, advertising, and/or fee basis. That is, a service supplier, such as a Solution Integrator, could offer to recover lost text. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
   initializing, by a computer processor of a computing apparatus, computer generated presentation data;
   presenting, by said computer processor via a first portion of a video monitor of said computing apparatus, said computer generated presentation data;
   monitoring, by said computer processor, input cursor focus with respect to said computer generated presentation data and a cursor of said computing apparatus;
   monitoring, by said computer processor, data input from a user with respect to said computer generated presentation data, wherein said data input comprises text data, interactions, and selections;
   presenting, by said computer processor to said user, an audio alert indicating that a specified memory unit is enabled;
   automatically and continuously storing, by said computer processor within said specified memory unit, said data input;
   directing, by said computer processor, a first portion of said data input to a first associated area in said computer generated presentation data, wherein said first portion comprises a portion of said text data;
   detecting, by said computer processor, a first focus change with respect to said cursor, said first associated area, and said data input;
   presenting, by said computer processor to said user in response to said detecting said first focus change, a graphical user interface (GUI) presenting: a message indicating said first focus change, a copy of said first associated area, a GUI switch for enabling a copy command and directing specified contents of said specified memory unit, and a field comprising current contents of said data input within said specified memory unit, wherein said GUI is simultaneously presented with said computer generated presentation data within a second portion of said video monitor, and wherein said first portion differs from said second portion;
   receiving via said GUI switch, by said computer processor from said user in response to said presenting, a command for automatically placing said current contents of said data input presented in said field within said first associated area;
   automatically placing, by said computer processor in response to said command, said current contents of said data input presented in said field within said first associated area;

directing, by said computer processor, a first dropdown menu selection of dropdown menu selections to an additional associated area in said computer generated presentation data;

additionally detecting, by said computer processor, an additional focus change with respect to said cursor, said additional associated area, and said data input;

additionally presenting, by said computer processor to said user in response to said additionally detecting said additional focus change, an additional message indicating said additional focus change; and receiving, by said computer processor from said user in response to said additionally presenting, an additional command from said user.

2. The method of claim 1, wherein said command indicates a request to enable a recovery of said data input from said specified memory unit, and wherein said method further comprises:

presenting, by said computer processor to said user in response to said command, a second portion of said data input associated with a second associated area in said computer generated presentation data, said second portion of said data input comprising data inputted after said detecting said first focus change; and directing, by said computer processor in response to an additional command from said user, said second portion of said data input to said second associated area in said computer generated presentation data.

3. The method of claim 2, wherein said specified memory unit comprises a buffer, and wherein:

wherein said directing said second portion of said data input to said second associated area is enabled via said GUI indicator.

4. The method of claim 3, further comprising:

presenting, by said computer processor via a specified portion of said video monitor, current contents of said buffer.

5. The method of claim 2, further comprising:

directing, by said computer processor in response to a second additional command from said user, said second portion of said data input to multiple areas in said computer generated presentation data.

6. The method of claim 2, wherein said computer generated presentation data comprises a presentation data selected from the group consisting of a Webpage generated document and a software generated document.

7. The method of claim 1, wherein said data input comprises data characters or data strings.

8. The method of claim 1, wherein said first focus change is associated with changing a focus from said computer generated presentation data to additional computer generated presentation data.

9. The method of claim 1, wherein said first focus change is associated with changing a focus from said first associated area in said computer generated presentation data to another area in said computer generated presentation data.

10. The method of claim 1, further comprising:

providing at least one support service for at least one of creating, integrating, hosting, maintaining, and deploying computer-readable code in the computing apparatus, said code being executed by the computer processor to implement said initializing, said presenting said computer generated presentation data, said monitoring said input cursor focus, said monitoring said data input, said presenting said audio alert, said automatically storing, said directing said first portion of said data input, said detecting, said presenting said message, said receiving said command from said user, said directing said first dropdown menu selection, said additionally detecting, said additionally presenting, and said receiving said additional command from said user.

11. A computing system comprising a computer processor coupled to a computer-readable memory unit, said memory unit comprising instructions that when executed by the computer processor implements a method comprising:

initializing, by said computer processor, computer generated presentation data;

presenting, by said computer processor via a first portion of a video monitor of said computing apparatus, said computer generated presentation data;

monitoring, by said computer processor, input cursor focus with respect to said computer generated presentation data and a cursor of said computing apparatus;

monitoring, by said computer processor, data input from a user with respect to said computer generated presentation data, wherein said data input comprises text data, interactions, and selections;

presenting, by said computer processor to said user, an audio alert indicating that a specified memory unit is enabled;

automatically and continuously storing, by said computer processor within said specified memory unit, said data input;

directing, by said computer processor, a first portion of said data input to a first associated area in said computer generated presentation data, wherein said first portion comprises a portion of said text data;

detecting, by said computer processor, a first focus change with respect to said cursor, said first associated area, and said data input;

presenting, by said computer processor to said user in response to said detecting said first focus change, a graphical user interface (GUI) presenting: a message indicating said first focus change, a copy of said first associated area, a GUI switch for enabling a copy command and directing specified contents of said specified memory unit, and a field comprising current contents of said data input within said specified memory unit, wherein said GUI is simultaneously presented with said computer generated presentation data within a second portion of said video monitor, and wherein said first portion differs from said second portion;

receiving via said GUI switch, by said computer processor from said user in response to said presenting, a command for automatically placing said current contents of said data input presented in said field within said first associated area;

automatically placing, by said computer processor in response to said command, said current contents of said data input presented in said field within said first associated area directing, by said computer processor, a first dropdown menu selection of dropdown menu selections to an additional associated area in said computer generated presentation data;

additionally detecting, by said computer processor, an additional focus change with respect to said cursor, said additional associated area, and said data input;

additionally presenting, by said computer processor to said user in response to said additionally detecting said additional focus change, an additional message indicating said additional focus change; and receiving, by said computer processor from said user in response to said additionally presenting, an additional command from said user.

12. The computing system of claim 11, wherein said command indicates a request to enable a recovery of said data input from said specified memory unit, and wherein said method further comprises:
presenting, by said computer processor to said user in response to said command, a second portion of said data input associated with a second associated area in said computer generated presentation data, said second portion of said data input comprising data inputted after said detecting said first focus change; and
directing, by said computer processor in response to an additional command from said user, said second portion of said data input to said second associated area in said computer generated presentation data.

13. The computing system of claim 12, wherein said specified memory unit comprises a buffer, and wherein:
said directing said second portion of said data input to said second associated area is enabled via said GUI indicator.

14. The computing system of claim 13, wherein said method further comprises:
presenting, by said computer processor via a specified portion of said video monitor, current contents of said buffer.

15. The computing system of claim 12, wherein said method further comprises:
directing, by said computer processor in response to a second additional command from said user, said second portion of said data input to multiple areas in said computer generated presentation data.

16. The computing system of claim 12, wherein said computer generated presentation data comprises a presentation data selected from the group consisting of a Webpage generated presentation data and a software generated presentation data.

17. The computing system of claim 11, wherein said data input comprises data characters or data strings.

18. A computer program product, comprising a computer readable hardware storage device storing a computer readable program code, said computer readable program code comprising an algorithm that when executed by a computer processor of a computing system implements a method, said method comprising:
initializing, by said computer processor, computer generated presentation data;
presenting, by said computer processor via a first portion of a video monitor of said computing apparatus, said computer generated presentation data;
monitoring, by said computer processor, input cursor focus with respect to said computer generated presentation data and a cursor of said computing apparatus;
monitoring, by said computer processor, data input from a user with respect to said computer generated presentation data, wherein said data input comprises text data, interactions, and selections;
presenting, by said computer processor to said user, an audio alert indicating that a specified memory unit is enabled;
automatically and continuously storing, by said computer processor within said specified memory unit, said data input;
directing, by said computer processor, a first portion of said data input to a first associated area in said computer generated presentation data, wherein said first portion comprises a portion of said text data;
detecting, by said computer processor, a first focus change with respect to said cursor, said first associated area, and said data input;
presenting, by said computer processor to said user in response to said detecting said first focus change, a graphical user interface (GUI) presenting: a message indicating said first focus change, a copy of said first associated area, a GUI switch for enabling a copy command and directing specified contents of said specified memory unit, and a field comprising current contents of said data input within said specified memory unit, wherein said GUI is simultaneously presented with said computer generated presentation data within a second portion of said video monitor, and wherein said first portion differs from said second portion;
receiving via said GUI switch, by said computer processor from said user in response to said presenting, a command for automatically placing said current contents of said data input presented in said field within said first associated area;
automatically placing, by said computer processor in response to said command, said current contents of said data input presented in said field within said first associated area;
directing, by said computer processor, a first dropdown menu selection of dropdown menu selections to an additional associated area in said computer generated presentation data;
additionally detecting, by said computer processor, an additional focus change with respect to said cursor, said additional associated area, and said data input;
additionally presenting, by said computer processor to said user in response to said additionally detecting said additional focus change, an additional message indicating said additional focus change; and
receiving, by said computer processor from said user in response to said additionally presenting, an additional command from said user.

* * * * *